United States Patent [19]

Frederiksen

[11] Patent Number: 4,799,677
[45] Date of Patent: Jan. 24, 1989

[54] VIDEO GAME HAVING VIDEO DISK READ ONLY MEMORY

[75] Inventor: Jeffrey E. Frederiksen, Arlington Heights, Ill.

[73] Assignee: Bally Manufacturing Corporation, Chicago, Ill.

[21] Appl. No.: 832,903

[22] Filed: Feb. 24, 1986

Related U.S. Application Data

[63] Continuation of Ser. No. 529,046, Sep. 2, 1983, abandoned.

[51] Int. Cl.$^4$ ................................................. A63F 9/22
[52] U.S. Cl. ............................ 273/1 E; 273/DIG. 28; 364/521; 340/724
[58] Field of Search ............ 273/1 E, 1 G, 1 C, 85 G, 273/DIG. 28, 138 A; 340/723–725; 364/521

[56] References Cited

U.S. PATENT DOCUMENTS

| | | | |
|---|---|---|---|
| 4,344,086 | 8/1982 | Mizuno | 358/78 |
| 4,521,014 | 6/1985 | Sitrick | 273/DIG. 28 |
| 4,580,782 | 4/1986 | Ochi | 273/DIG. 28 |

Primary Examiner—Maryann Lastova
Attorney, Agent, or Firm—Jenner & Block

[57] ABSTRACT

There is provided a video game system utilizing a video disk as a read only memory to store digital video image data for use in generating the video game images. The video data is stored by compressing digitized video data using color cell compression and then further compressing the data to multi-level data encoded with partial response coding. The data is retrieved from the video disk ROM by using an inverse of this compression process.

16 Claims, 8 Drawing Sheets

VIDEO GAME HAVING VIDEO DISK READ ONLY MEMORY

This is a continuation of application Ser. No. 529,046 filed Sept. 2, 1983, now abandoned.

BACKGROUND OF THE INVENTION

The present invention relates generally to video game apparatus and more particularly to a video amusement game utilizing a consumer video disk as a read only memory for storage of compressed digitized video data and non-video digital data.

It has become increasingly advantageous to employ digital techniques to process video image signals in digital form. It is particularly true in the video game art where access to and manipulation of large amounts of video information has become more and more essential. Unfortunately, the digitized video signals typically require eight bits of digital data for each of the hundreds of thousands of separate picture elements (pixels) in each video frame. Thus, a bit rate in excess of 240 megabits per second can result from digitizing video image signals. Storage of video data in view of the resulting large amount of data and the wide bandwidth required causes extremely expensive storage systems to be necessary.

One highly efficient and cost effective analog storage device known in the art is the consumer video disk. However, U.S. consumer video disk recorders have a standard analog television channel bandwidth limit of approximately 4.2 Mhz (i.e. bandwidth limit determined by NTSC standards) and therefore, have not been suitable as a memory device for digitized video signals. Therefore, the need exists for an effective means to record and replay digitized video signals on a video disk to permit the use of a video disk as a memory device in video games.

Accordingly, it is an object of the present invention to provide an improved video game employing a video disk as random access memory utilized as a read only memory to store digitized video signals.

As yet another object of the invention is to provide a cost effective means for storage of large amounts of digital video data for a video game.

Briefly, in accordance with one aspect of the invention there is provided a video amusement game comprising a video display for the display of video images, a video disk for data storage, and input controls for providing user signals responsive to a player. Video disk retrieval apparatus is provided for retrieval of stored, compressed, digitized video signals representative of at least portions of the video images from the video disk. In addition, circuitry is provided for reconstruction, on the video display, of video images responsive to the user signals, and utilizing the compressed digitized video signals retrieval from the video disk.

BRIEF DESCRIPTION OF THE DRAWINGS

The features of the present invention which are believed to be novel are set forth with particularity in the appended claims. The invention, together with further objects and advantages thereof, may best be understood by reference to the following description and taken in conjunction with the accompanying drawings.

DETAILED DESCRIPTION OF THE PREFERRED EMBODIMENT

In general, the invention concerns video image signals for a video display. For the preferred embodiment, the video display is made up of 525 lines of which approximately 468 are used for visible video display and the horizontal lines are made up to 682.5 pixels of which 560 are used for visible video. With a standard rate of 30 frames per second, a sample rate of $3f_c$ (where $f_c$ is the chroma frequency, which is 3.579 Mhz for the NTSC standard) is employed to digitize the video image signals. It should be noted that these values are only for illustrative purposes and that a wide variety of values may be used with the invention.

The above described video image signals are digitized and the resulting digitized video data is compressed using a combination of compression techniques. This compressed signal may also be encoded for bit and burst error correction. In addition, digital non-video data can be added either in lieu of video data or during blanking periods or interchangably stored in separate frames of video disk storage. Also, analog data can be stored in separate frames in lieu of digital video data. The composite signal, including standard sync and blanking signals is then recorded on a conventional consumer video disk. The above technique can be performed in stages or in real time.

The recorded, compressed, digitized video signals can then be retrieved from the video disk, optionally error corrected, and expanded, resulting in recovered digitized video data. The recovered digitized video data may subsequently be Digital to Analog (D/A) converted and displayed, or may be processed in digital form for use by a video game. In the video game, the video disk and data retrieval apparatus is employed in accordance with the invention, as a read-only memory (ROM) for storage of video data utilized to generate the video game display.

Figure 1A:
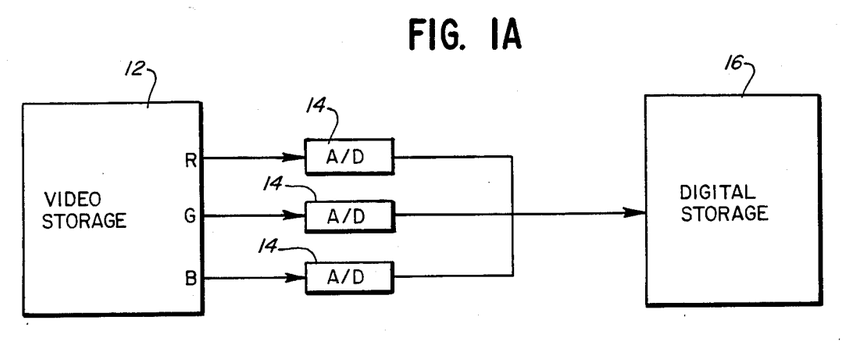
FIG. 1A is a block diagram of a specific embodiment of apparatus for digitizing and storing video signals.

Referring now to FIG. 1A there is shown a block diagram of apparatus for digitizing video signals. In the preferred embodiment red (R), green (G), and blue (B) analog video signals are coupled from a video source 12 to A/D converters 14, as shown. The video source 11 can be any source of video signals such as video cameras or a simulation computer. It should also be noted, although the RGB video format is preferred for coin-operated video games, other video signal formats (eg. y (r−y), (b−y) used in the NTSC standard) may also be used. In the preferred embodiment, the three A/D converters 14 each converts the analog video signal to an eight bit digital sample at a sample rate of $3f_c$ (where $f_c$ is the chroma frequency, in the preferred embodiment the NTSC standard of 3.579 Mhz is used resulting in a sample rate of 10.74 megasamples per second). Many sample rates are suitable, but an integer multiple of the chroma frequency $f_c$ is preferable. Using the sample rate of $3f_c$ where $f_c$ is 3.579 Mhz, the digitized video data from the three A/D converters 14 is in excess of 250 megabits per second. The 24 bits per sample from the three A/D converters 14 are coupled, as shown, to a digital storage device 16, preferably a digital magnetic disk.

Figure 1B:
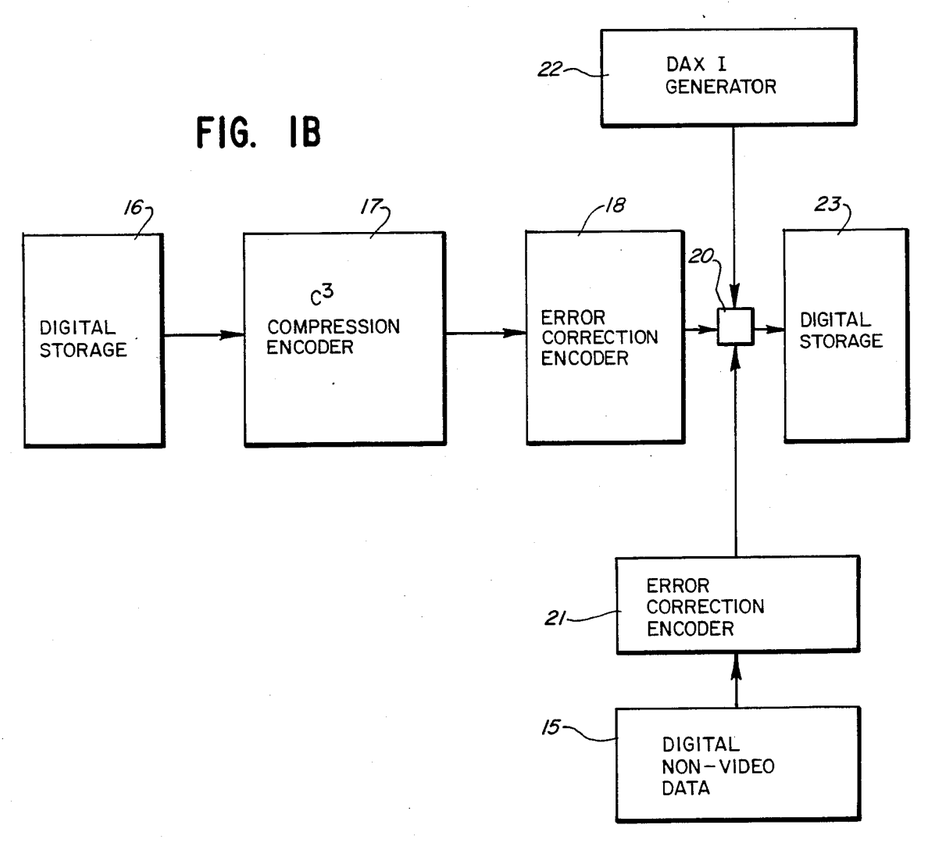
FIG. 1B is a block diagram of a specific embodiment of apparatus for color cell compression and optional error correction encoding of digitized video signals.

After the digitized video signals have been stored in the storage device 16, they are coupled as shown in FIG. 1B, to a color cell compression ($C^3$) encoder 17. The encoder 17 compresses the video data using a color cell compression coding technique, which is a form of block truncation coding. Block truncation coding is well known in the art, and is described in "Digital Video Bandwidth Compression Using BTC," IEEE Transactions on Communication, Volume COM-29, No. 17, December, 1981, D. J. Healy and O. R. Mitchell (also see U.S. Pat. No. 4,319,267 issued May 29, 1981 to Mitsuya, et al).

Briefly, color cell compression is a video data compression technique which can compress video data by up to a factor of 12. The full display is subdivided into blocks each comprising a 4×4 pixel matrix. A color memory map is created having 256 unique addresses for each set of data identifying each of 256 colors. Only two colors are selected for any one block of pixels, so that every pixel in a given block must have one of the two colors selected for that block. Thus, the color of each pixel may be represented by only a single data bit—either a "1" or "0"—in combination with two addresses per block representing the color map memory address for the two colors selected for each block. Thus, since a block comprises a 4×4 pixel matrix, the colors of the 16 pixels in that matrix can be represented by a total of 32 bits: 2 eight bit numbers representing the memory addresses of the two selected colors, and one bit indicating which of the two colors has been selected for each of the 16 pixels in that block. The end result is compressed video data of only two bits per pixel reduced from the initial 24 bits per pixel. The compressed video data from the encoder 17, is coupled as shown, to an optional error correction encoder 18.

Error correction can be used to reduce errors in video data. However, video data is highly redundant and therefore error correction is less critical than with many other types of non-video digital data. Thus, error correction encoding for the video data is optional. When error correction is to be used, the color cell compression encoder 17 is coupled to the error correction encoder circuit 18 where the compressed video data is encoded using a random bit error correction code. Any of a variety of widely known random bit error correction codes may be used such as a Hamming (22, 16) code or a Golay (23, 12) code. Using a Hamming (22, 16) code results in a capability of correcting 1 bit per 16 bits of data, and approximately a 37% increase in the number of bits while a Golay (23, 12) code permits correcting 3 bits of each 12 bits of data, but increases the number of bits by 91%. It is preferable to maximize the number of bits of error correction capability while minimizing the increase of data bits.

The error correction encoded data of the encoder 18 can also be burst error encoded. Burst error encoding is widely known in the art and is achieved by interleaving the data such that the data bits are distributed so that the burst of errors does not affect more bits than can be corrected by the random bit error correction code used.

It has been found that the largest burst error length from a video disk is about 150 bits based upon a $3f_c$ sampling rate. Preferably, an order of interleaving should be chosen such that the number of bits correctable times the order of interleaving is greater than the maximum burst length (e.g. with a Hamming (22, 16) code an interleaving order of 200 or greater would be suitable, while only one third that order would be needed with the Golay (23, 12) code). The burst error correction encoded data from the error correction encoder 18 is coupled, to a signal combining circuit 20, where it is added to a signal coupled from an encoder 21, as shown. When error correction of video data is not employed, the compressed video data from the compression encoder 17 is coupled directly to the combining circuit 20.

A non-video digital data source 15 provides digital data such as digitized game sounds, digitized text, or program data for use by a computer. The data source 15 may, by way of example, be an analog sound signal generator in conjunction with an A/D converter. The non-video digital data from the data source 15 is coupled, as shown, to the error correction encoder 21 which bit error correction encodes the data, (using, for example, a Golay (23, 12) three bit error correction code and then burst error correction encodes the data by interleaving in the conventional manner. The burst error encoded data is then coupled to the combining circuit 20, where it is combined with the video data stream. In addition, a 77 bit data code, (commonly called a DAXI code in video drives marketed by RCA), can optionally be coupled, as shown, to the combiner 20, from a DAXI generator 22 and added to the data stream at the seventeenth (17th) and Two Hundred Eightieth (280th) line. This code contains location and other information and includes a 13 bit Barker code used by the recorder and a 14 bit CRC code. In the preferred embodiment, however, the DAXI code is added at a later point to be described hereinafter.

After the data signals have been combined at combiner 20, the data is coupled to a digital storage device 23, as shown, and stored for further compression. The digital storage device 23 may be any of a number of available storage devices, preferably non-volatile, such as magnetic disks or an array of programmable read-only memories (PROM). In a preferred embodiment the storage device 23 is an array of PROMs.

Figure 1C:
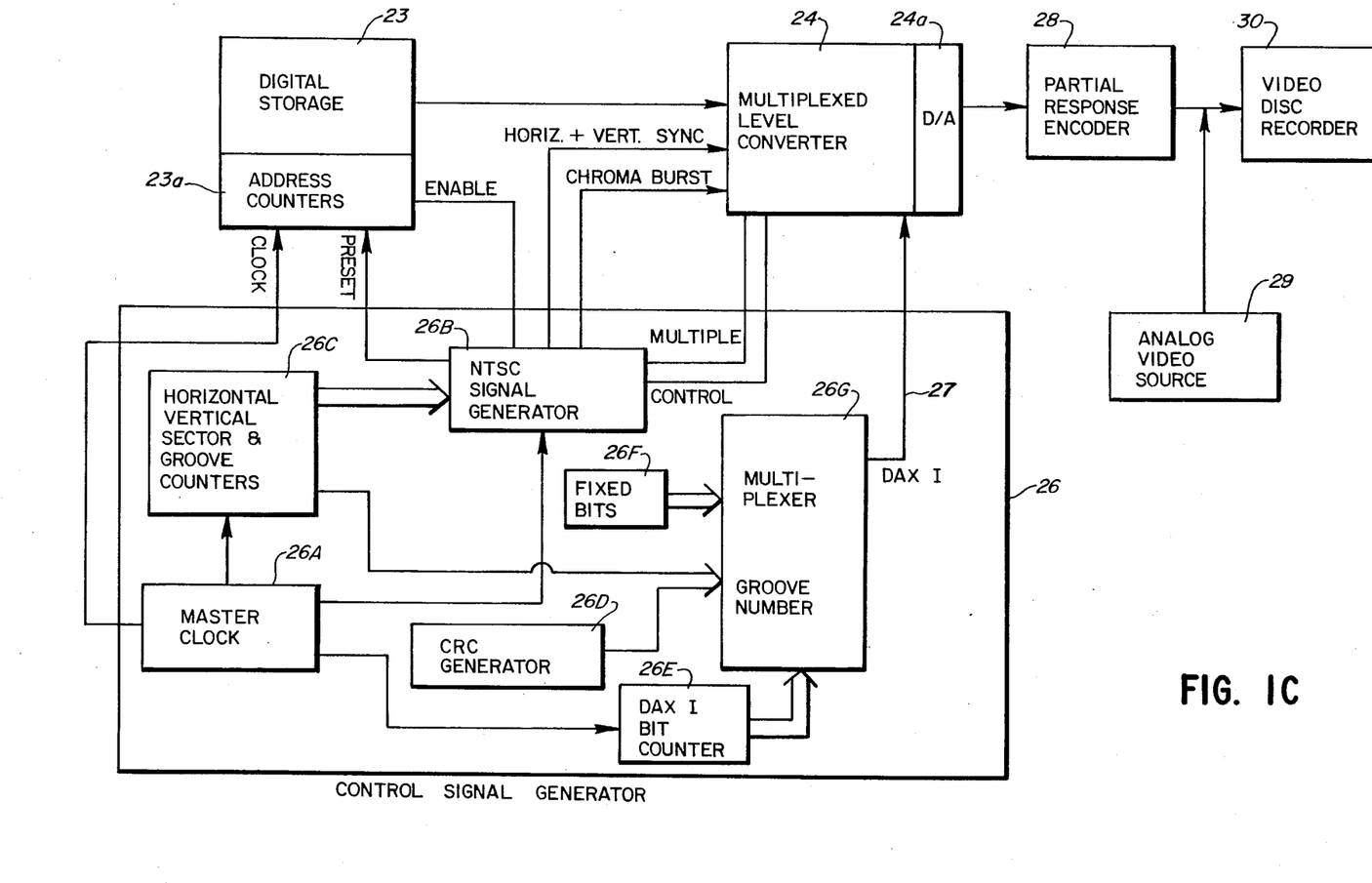
FIG. 1C is a block diagram of a specific embodiment of apparatus for further compression and storage on a video disk of compressed digitized video signals.
Figure 2A:
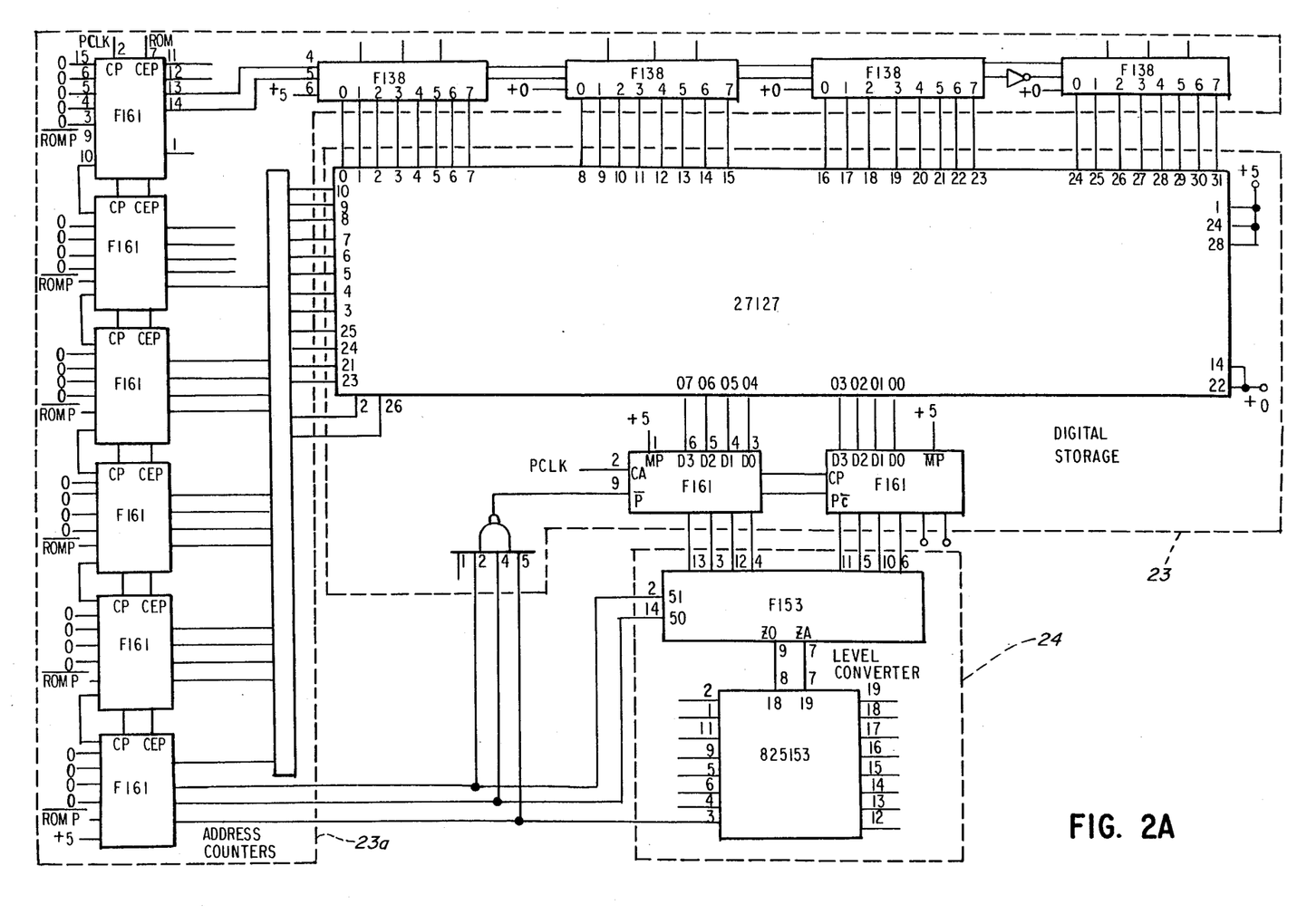
FIGS. 2A-F are detailed schematic diagrams of the blocks illustrated in FIG. 1C.
Figure 2B:
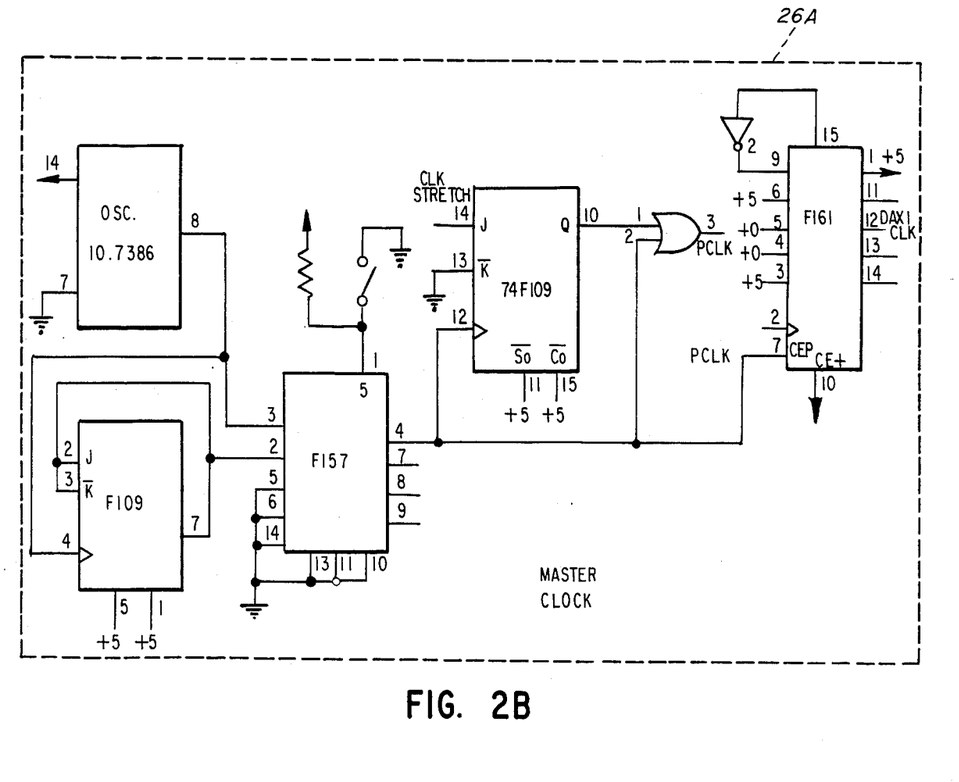
Figure 2C:
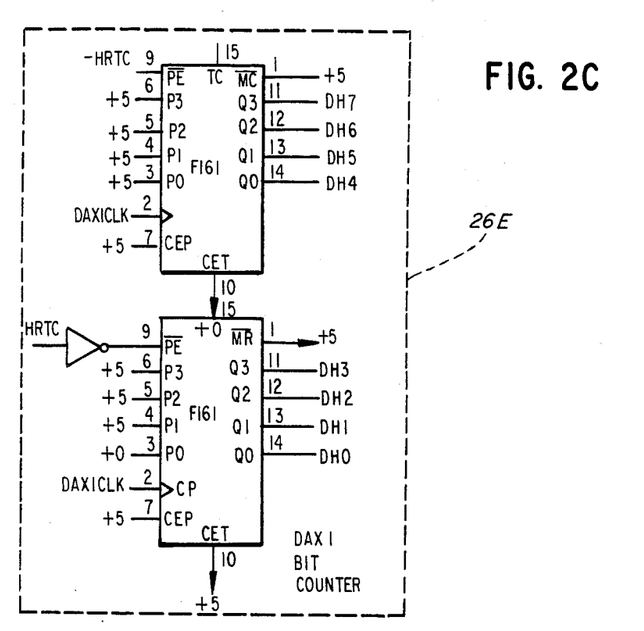
Figure 2D:
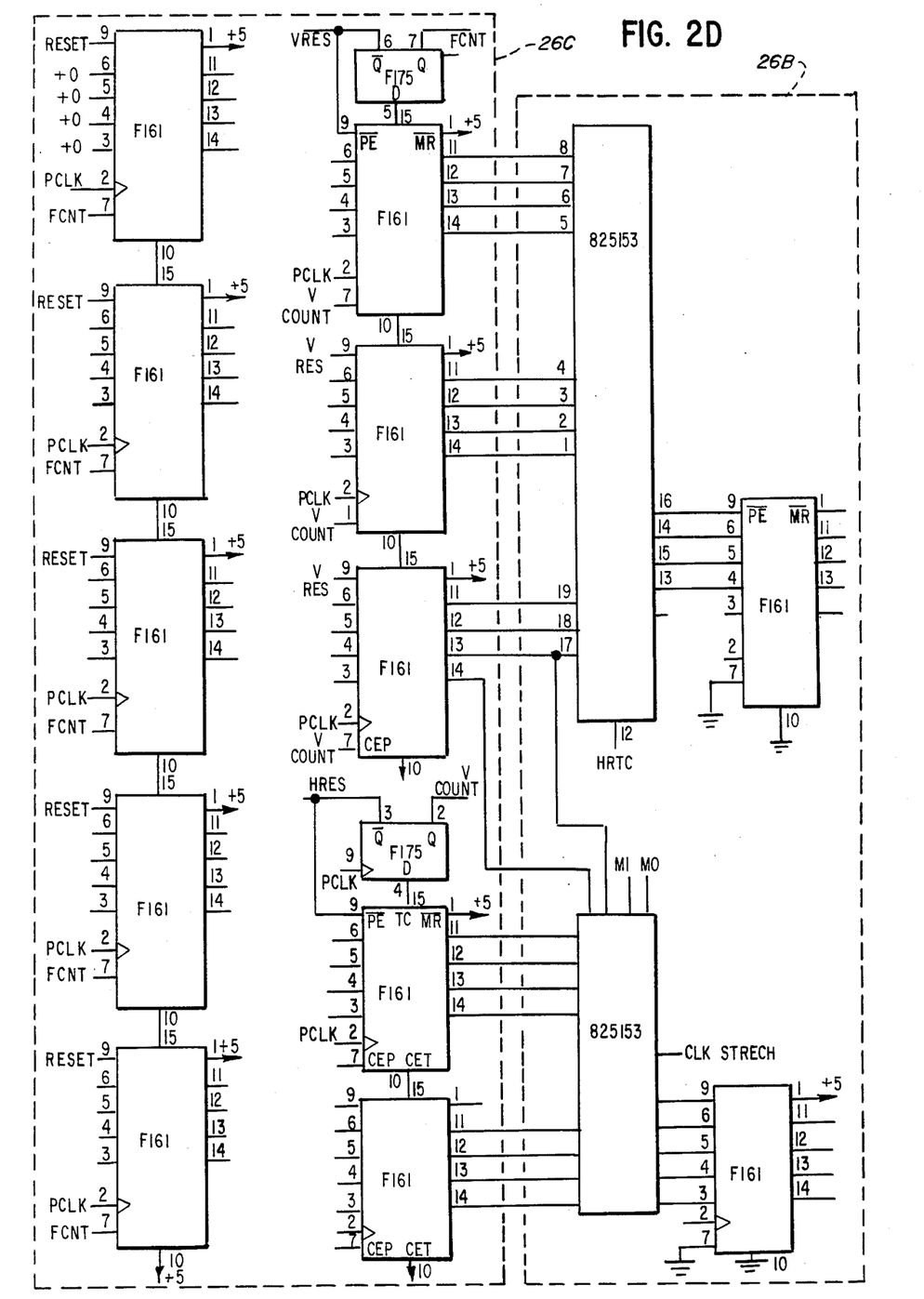
Figure 2E:
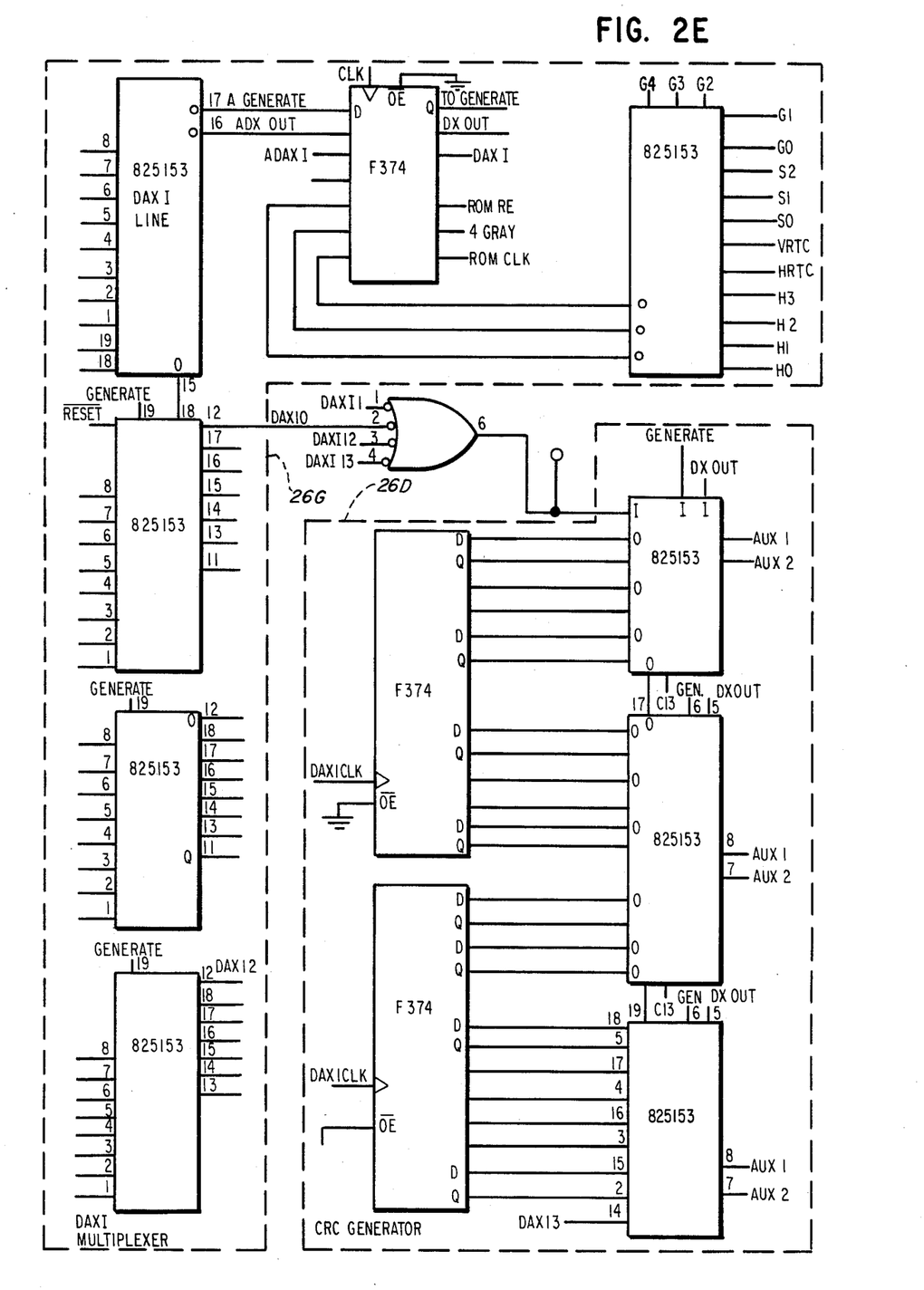
Figure 2F:
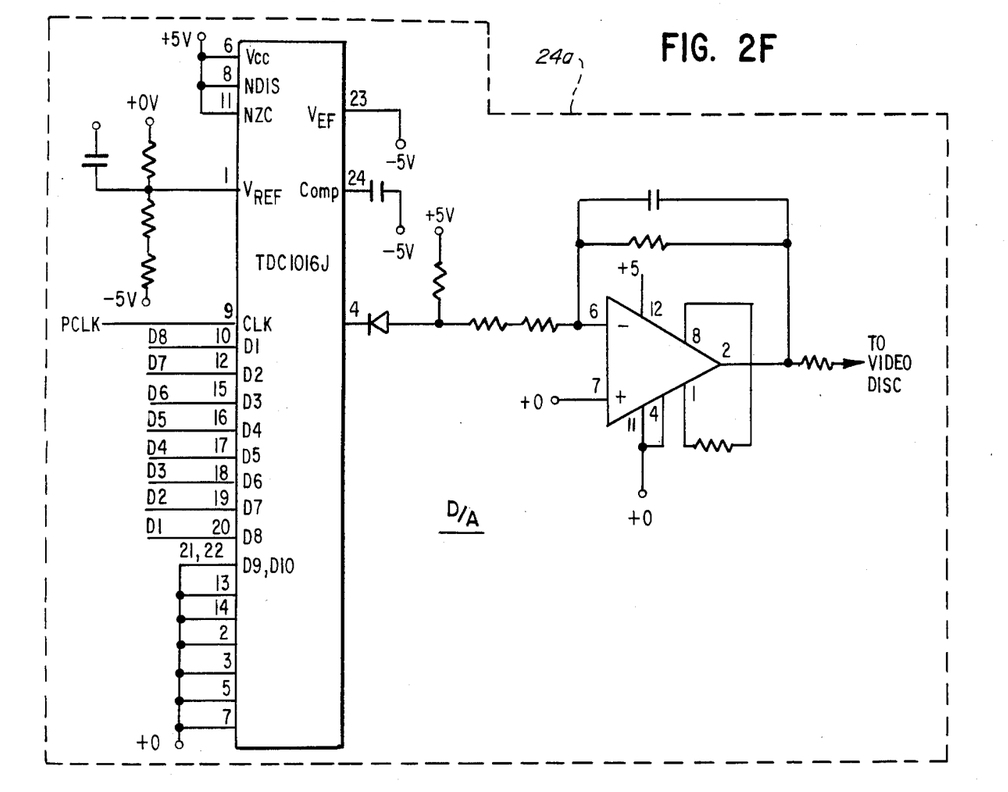

Once the compressed video data has been stored in the storage device 23, the storage device 23 is coupled, as shown in FIG. 1C, to a multiplexed level converter 24 which includes a D/A converter 24a. Such level converters are well known in the art (e.g. see "Digital Communications, Kamilo Feher, copyright 1981). The data is read out of the PROMS under control of control signals coupled from a signal control generator circuit 26, as shown. In the preferred embodiment, the data is read out at a sample rate of approximately 5.37 megasamples per second or a bit rate of approximately 10.74 megabits per second. Alternatively, it may be read out at the original sample rate of 10.74 megasamples.

A master clock 26A generates a clock signal which is coupled from the generator circuit 26 to the digital storage device 23 and clocks the data to the level converter 24. A preset signal from an NTSC signal generator 26B presets the storage device 23 to start readout. An enable signal from the NTSC generator 26B enables and disables the readout of data thereby producing the conventional NTSC blanking intervals if required. The NTSC generator 26B also generates Horizontal and Vertical Synchronization signals required for an NTSC signal and couples them, as shown, to the multiplexed level converter 24. These signals are multiplexed with the data from the digital storage device 23 during proper intervals under the control of multiplex control signals generated by the NTSC signal generator 26B. The control signal generator 26 includes a set of counters 26C, coupled to the master clock 26A, which count the clock pulses and thereby maintain a count of the horizontal, and vertical position, in the video image, as well as sector and groove position on the disk. In addition, the control signal generator includes a DAXI generator made up of a CRC generator 26D, a counter 26E, and a memory circuit 26F for providing a set of predetermined fixed bits, each coupled to a multiplexer 26G which outputs a DAXI code bit stream on an output conductor 27, as shown. The DAXI generator couples a 77 bit DAXI signal to the level converter 24 via the conductor 27, where it is inserted at line 17 and 280 of the video frames, as described hereinabove. Alternatively, other video disk interface protocols can be utilized instead of or in addition to DAXI.

The video digital signal which is coupled from the digital storage device 23 to the level converter 24, is converted from a binary to a multi-level signal. Preferably, the signal is converted to a four level signal from a binary signal resulting in further bandwidth compression of a factor of 2 producing a "dual bandwidth compressed signal."

The dual bandwidth compressed signal produced by the level converter 24 is coupled, as shown, to an optional partial response encoder 28. If utilized, the partial response encoder 28 encodes the dual bandwidth compressed video data using first order partial response coding which is well known in the digital communication art (e.g. see "Digital Communications," by Kamilo Feher, copyright 1981). This encoding technique deliberately introduces a limited amount of intersymbol interference to produce an encoded signal which can be recorded at a rate as much as 40% higher than the Nyquist rate. The combined video signal from the level converter 24 or the optional partial response encoder 28 is coupled to the video disk recorder 40, as shown, and recorded on a video disk (not shown). Analog video data from a source 29 can also be recorded on the video disk by the recorder 40. Analog data from the source 29 is stored by the recorder 40 in separate frames in lieu of video data from the partial response encoder 28 or multiplexed level converter 24.

FIG. 1C shows a detailed block diagram of apparatus for compression and storage of compressed digitized video data on a video disk. FIGS. 2A-F are corresponding detailed electronic schematics of the apparatus illustrated in FIG. 1C. The detailed electronic circuitry of FIGS. 2A-F are blocked in functional subgroups and numbered corresponding to the respectively numbered functional blocks of FIG. 1C. The above discussion relative to FIG. 1C applies correspondingly to the FIGS. 2A-F.

Figure 3:
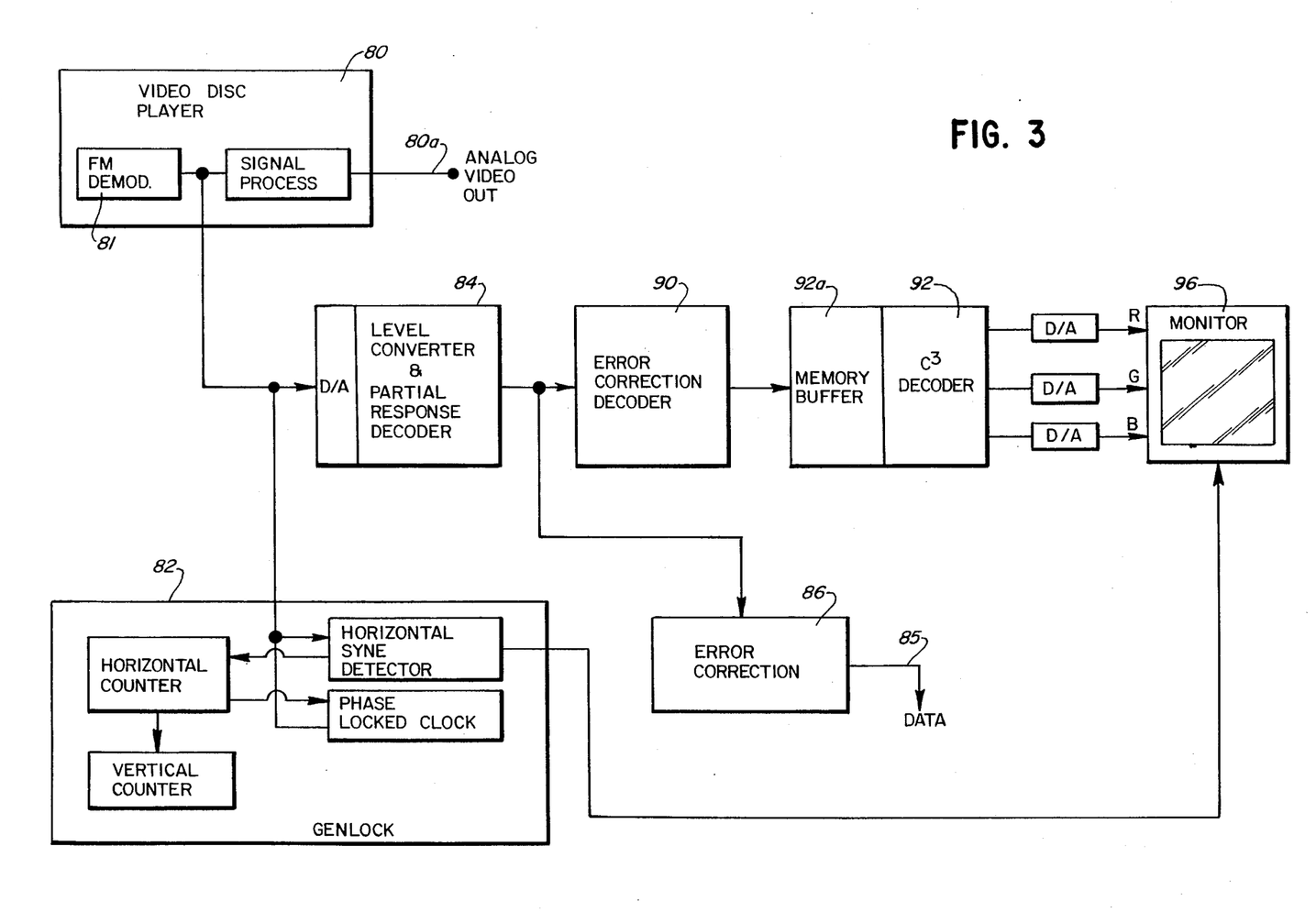
FIG. 3 is a block diagram of a specific embodiment of apparatus for real time playback of compressed digitized video data stored on a video disk.

Referring now to FIG. 3, there is illustrated a block diagram of a system for real time retrieval (i.e. playback) of compressed, digitized video data stored on a video disk. A conventional video disk recorder 80 is utilized for playback of a disk recorded according to the above described recording technique. The conventional video disk player 80 may be controlled with a computer (not shown) to, for example, address a desired frame, or may be free running without computer control. The video disk player 80 is modified to permit extracting a demodulated signal directly from the FM demodulator 81, as illustrated, but prior to other signal processing circuits commonly employed in consumer video disk players. Where analog signals have been recorded, the analog video signals are reproduced and output at an analog output 80a. The demodulated signal from the demodulator 81 is coupled, as shown, to a level converter 84 and a control signal recovery circuit 82 (commonly known as a Genlock circuit widely used in the recording industry). The Genlock circuit 82 recovers the synchronization and chroma signals, generates a clock signal phase locked to the chroma frequency, and includes counters to track horizontal and vertical position in the video image. These signals can be used for control, for example, by a video game computer when the system of FIG. 2 is utilized according to the invention as ROM in a video game. The level converter 84 includes an A/D converter for decoding the multi-level video signal converting the signal back to binary form. If partial response encoding was employed, the partial response encoded signal is decoded utilizing an inverse of the partial response encoding described above. Such conversion is well known in the art (eg. see Digital Communications, Kamilo Feher, copyright 1981). The decoded binary signal is coupled, as shown, to an error correction decoder 90 and an error correction decoder 86. The error correction decoder 90 is employed only if error correction was utilized for encoding the video data, as shown in FIG. 1C. The decoder 90 first deinterleaves the burst error encoded data and then performs error correction utilizing error correction decoding based upon the error correction code used during encoding. The error correction decoder 86 is required only if a different error correction code is utilized to encode the non-video data. The decoder 86 decodes the non-video data by first deinterleaving and then, based on the error correction code used to encode the data, decodes the encoded data and performs error correction. The non-video data is output from the decoder 86 on conductor 85. The error corrected data from the decoder 90 is also coupled to the color cell compression decoder 92 which expands the data into digital video red, green, blue signals. The color cell compression decoder 92 includes memory buffer circuitry 92a which is utilized to store incoming digitized, encoded data and to permit manipulation of the data. After expansion by the decoder 92, the video RGB signal, made up of 24 bits per pixel, can be coupled as shown to three A/D converters 94 for conversion to analog signals. The resulting analog signals are coupled, as shown, to a video monitor 96 for display. The digital video signals from the decoder 92 may also be utilized without D/A conversion, according to the invention, by a video game processor. Synchronization and blanking signals required for display may be provided by the the control signal recovery circuit 82, as shown.

Figure 4:
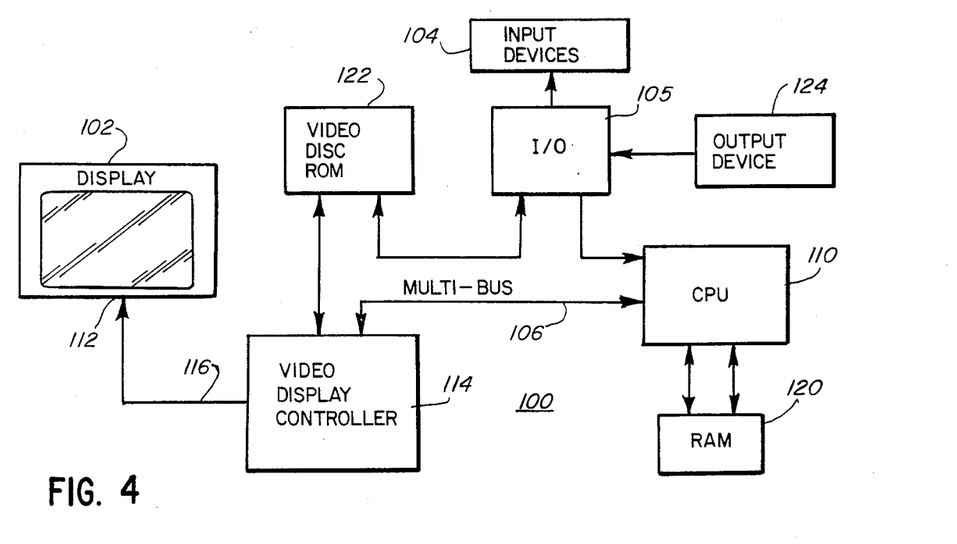
FIG. 4 is a block diagram of a specific embodiment of a video amusement game employing a video disk as read only memory (ROM) according to the invention.

FIG. 4 is a block diagram illustrating the video game apparatus 100 which utilizes a conventional video disk and the present retrieval system, described above, excluding the A/D converter 94 and the display 96, as a ROM for storage of digital video image data. The video game apparatus 100 includes a video display 102 for presentation of the play of a video game. Such video games are well known in the art, such as that described in U.S. Pat. No. 4,296,930 issued to the instant inventor on Oct. 27, 1981 and assigned to Bally Manufacturing Corporation. The game apparatus 100 includes user control inputs 104 for generating user control signals which are coupled through a conventional I/O interface 105 to a multiple bus 106 which couples the user control signals to a programmed processor 110. In accordance with the present invention, a video signal is applied to an input 112 of the video display from the video display controller 114 via a bus 116. The video display controller 114 generates conventional synchronization and blanking signals required for proper display and combines them with video signals coupled from the programmed processor 110. The processor 110 generates the video game display in interaction with the user control signals and a program and data stored in random access memory 120 and in read only memory 122. Thus, the processor 110 together with the video display controller 114 functions as a means for reconstruction on the video display 102 of video game imagery. The read only memory 122 is a video disk with prerecorded compressed, digital video image data stored for use by the processor 110. The processor 110 thus generates video signals which are coupled via the multibus 106 to the video display controller 114, thereby producing the video game images on the video display 102. In addition, the processor 110 produces additional control signals which are coupled via the multibus 106 through the I/O interface 105 through output devices 124. The output devices 124 include such devices as sound transducers to produce game sounds under the control of the processor 110.

A preferred embodiment of a video game utilizing a video disk as ROM for storage of digital video image data has been described for the purposes of illustrating the manner in which the invention may be made and used. It should be understood that other variations and modifications may be implemented, and that the invention is not limited thereto by the specific embodiments described. It is therefore contemplated to cover by the present invention any and all modifications, variations, or equivalents that fall within the true spirit and scope of the basic underlying principles disclosed and claimed herein.

What is claimed is:

1. In a video display system having means for displaying video imagery and an input means responsive to an operator for providing operator control signals, a storage and retrieval system comprising:
   means for storing data representing digital video data signals for generating video imagery on the display means, said storage means including: means for compressing said digital video data signals, means for combining said compressed digital data signals with video control signals and means for converting to multi-level signals wherein said converted multi-level signals are stored as said data;
   means coupled to said storage means, said input means and the display means for controlling the display of selected video imagery represented by the data stored in the storage means, said displayed video imagery being selected in response to said operator control signals;
   means coupled to said storage means and said control means for recovering said video control signals to control the display of selected video images on the display means;
   level converter means coupled to said storage means and said control means for converting the multi-level signals representing selected video imagery to binary signals;
   a first decoding means for expanding said binary signals to transform said signals to said digital video data in uncompressed form, said video data being coupled to the display means for the display of the selected video imagery.

2. The video display system of claim 1 wherein said storage means is a video disc.

3. The video display system of claim 1 wherein the compressed, digital signals have been compressed by color cell compression techniques for storage and said first decoding means utilizes an inverse of said color cell compression to transform the binary signals.

4. The video display system of claim 1 wherein the stored data representing the video image signals is a four level signal and said level converter means converts the four level signals to binary signals.

5. The video display system of claim 1 wherein the digital and compressed video image signals have been encoded for error correction before being stored and said system further includes an error correction decoder coupled to said level converter means for decoding the error correction encoded signals to provide error corrected data which is coupled to the first decoding means.

6. The video display system of claim 5 wherein the digital and compressed video image signals are encoded using a random bit error correction code and said error correction decoder decodes said random bit error code.

7. The video display system of claim 5 wherein the digital and compressed video image signals are burst error encoded and said error correction decoder includes means for deinterleaving the binary signals from the level converter means.

8. The video display system of claim 1 wherein the multi-level signals representing the video image signals are partial response encoded before being stored and said system further includes partial response decoding means coupled to said level converter means for decoding the binary signals using the inverse of the partial response code used to encode the multi-level signals, the output of the partial response decoding means coupled to said first decoding means.

9. In a video display system having means for displaying video imagery and an input means responsive to an operator for providing operator control signals, a storage and retrieval system comprising:
   means for storing data representing digital video image signals for generating video imagery on the display means, said storage means including: means for compressing said digital video signals, means for combining said compressed digital data signals with video control signals and means for converting to a multi-level signals wherein said converted multi-level signals are stored as said data;
   means coupled to said storage means, said input means and the display means for controlling the display of selected video imagery represented by the data stored in the storage means, said displayed video imagery being selected in response to said operator control signals;
   means coupled to said storage means and said control means for recovering said video control signals to control the display of selected video images on the display means;

level converter means coupled to said storage means and said control means for converting the multi-level signals representing selected video imagery to binary signals;

a first decoding means for expanding said binary signals to transform said signals to uncompressed form; and means for converting said expanded signals to the video image signals represented thereby, said video image signals being coupled to the display means for the display of the selected video imagery.

10. The video display system of claim 9 wherein said storage means is a video disc.

11. The video display system of claim 9 wherein the digital video image signals have been compressed by color cell compression techniques for storage and said first decoding means utilizes an inverse of the color cell compression to transform the binary signals.

12. The video display system of claims 9 wherein the stored data representing the video image signals is a four level signal and said level converter means converts the four level signals to binary signals.

13. The video display system of claim 9 wherein the digital and compressed video image signals have been encoded for error correction before being stored and said system further includes an error correction decoder coupled to said level converter means for decoding the error correction encoded signals to provide error corrected data which is coupled to the first decoding means.

14. The video display system of claim 13 wherein the digital and compressed video image signals are encoded using a random bit error correction code and said error correction decoder decodes said random bit error code.

15. The video display system of claim 13 wherein the digital and compressed video image signals are burst error encoded and said error correction decoder includes means for deinterleaving the binary signals from the level converter means.

16. The video display system of claim 9 wherein the multi-level signals representing the video image signals are partial response encoded before being stored and said system further includes partial response decoding means coupled to said level converter means for decoding the binary signals using the inverse of the partial response code used to encode the multi-level signals, the output of the partial response decoding means coupled to said first decoding means.

* * * * *